United States Patent
Deppe et al.

(10) Patent No.: US 9,099,879 B2
(45) Date of Patent: Aug. 4, 2015

(54) SUPPLY CIRCUIT FOR SUPPLYING POWER TO A SWITCH CIRCUIT

(75) Inventors: Carsten Deppe, Aachen (DE); Matthias Wendt, Wuerselen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 926 days.

(21) Appl. No.: 13/256,231

(22) PCT Filed: Mar. 9, 2010

(86) PCT No.: PCT/IB2010/051005
§ 371 (c)(1),
(2), (4) Date: Dec. 14, 2011

(87) PCT Pub. No.: WO2010/103458
PCT Pub. Date: Sep. 16, 2010

(65) Prior Publication Data
US 2012/0074791 A1 Mar. 29, 2012

(30) Foreign Application Priority Data
Mar. 13, 2009 (EP) .................................. 09155140

(51) Int. Cl.
*H02M 7/02* (2006.01)
*H02J 9/00* (2006.01)
*H02M 7/06* (2006.01)
*H02M 1/00* (2007.01)

(52) U.S. Cl.
CPC ............... *H02J 9/005* (2013.01); *H02M 7/02* (2013.01); *H02M 7/066* (2013.01); *H02M 2001/0032* (2013.01); *Y02B 70/16* (2013.01)

(58) Field of Classification Search
CPC ........................................................ H02M 7/02
USPC ............................................................ 307/112
See application file for complete search history.

(56) References Cited

U.S. PATENT DOCUMENTS

| 6,072,286 A * | 6/2000 | Sears ............................ 315/313 |
| 2005/0162100 A1 * | 7/2005 | Romano et al. ............... 315/291 |
| 2008/0164768 A1 | 7/2008 | Litwack |

FOREIGN PATENT DOCUMENTS

| CN | 101261500 A | 9/2008 |
| EP | 1124319 A2 | 8/2001 |
| JP | 55142398 A | 11/1980 |
| RU | 2208284 C1 | 7/2003 |
| WO | 0221673 A1 | 3/2002 |

* cited by examiner

*Primary Examiner* — Adi Amrany
(74) *Attorney, Agent, or Firm* — Yuliya Mathis

(57) ABSTRACT

To improve energy efficiencies, supply circuits (1) for supplying switch circuits (2) have first supply modes for receiving first amounts of input power from sources (7) and providing first amounts of output power to output circuits (5) comprising control parts (3) of the switch circuits (2) and have second supply modes for receiving second amounts of input power and providing second amounts of output power. The first amounts of output power are larger than the second amounts of output power. The second amounts of input power are larger than zero and smaller than amounts of switch power necessary for operating the switch circuits (2). The switch circuits (2) may comprise relays for switching loads (8). The first amounts of input power may arrive via main contacts of the relays. Switches (47) may switch output signal levels. The relays may be bistable relays.

6 Claims, 8 Drawing Sheets

SUPPLY CIRCUIT FOR SUPPLYING POWER TO A SWITCH CIRCUIT

FIELD OF THE INVENTION

The invention relates to a supply circuit for supplying a switch circuit, and also relates to a device comprising a supply circuit and to a method.

Examples of such a supply circuit are supplies such as power supplies, and converters such as power converters. Examples of such a device are consumer products and non-consumer products such as industrial products.

BACKGROUND OF THE INVENTION

A prior art supply circuit receives first energy from a source and dissipates second energy and provides third energy to an output circuit. The output circuit may comprise a switch circuit for switching a load on and off. When being switched off, the load cannot consume energy. When being switched on, the load may consume energy. So, the switch circuit improves an energy efficiency of the load.

SUMMARY OF THE INVENTION

It is an object of the invention to provide a supply circuit for supplying a switch circuit, wherein the supply circuit has an improved energy efficiency. Further objects are to provide a device and a method.

A first aspect of the invention relates to a supply circuit for supplying a switch circuit, the supply circuit having a first supply mode for receiving a first amount of input power from a source and providing a first amount of output power to an output circuit comprising at least a control part of the switch circuit, the supply circuit having a second supply mode for receiving a second amount of input power and providing a second amount of output power, the first amount of output power being larger than the second amount of output power, and the second amount of input power being larger than zero and being smaller than an amount of switch power necessary for operating the switch circuit.

The supply circuit has got at least two modes. In a first supply mode, (at most) a first amount of input power is received from a source such as for example an alternating-current source or AC source, and (at most) a first amount of output power can be provided to an output circuit comprising at least a control part of the switch circuit. In a second supply mode, (at most) a second amount of input power is received and (at most) a second amount of output power can be provided. The first amount of output power is larger than the second amount of output power, and the second amount of input power is larger than zero and is smaller than an amount of switch power necessary for operating the switch circuit.

Owing to the fact that the supply circuit has been given at least two different modes and owing to the fact that the supply circuit can provide different maximum amounts of output power in the different modes, for example depending on how much output power is needed, an energy efficiency of the supply circuit has been improved.

The first supply mode is for example an operation mode, and the second supply mode is for example a standby mode, without having excluded other kinds of modes. The switch circuit usually forms part of the supply circuit. The switch circuit comprises a control part and a switch part. The control and switch parts each may or may not form part of the supply circuit.

The supply circuit is further advantageous in that, in the second supply mode, although less output power being available for the output circuit, some output power is still available, for example for an other part of the output circuit, such as a detector for detecting for example a presence or an absence of a person, or such as a receiver for receiving an instruction or information.

An embodiment is defined by the switch circuit comprising a relay for switching a load. A relay can switch a load fully off, without a leakage current being able to flow.

An embodiment is defined by the first supply mode corresponding with a conducting mode of the relay, and the second supply mode corresponding with a non-conducting mode of the relay. A first supply mode such as for example an operation mode should coincide with a conducting mode of the relay, and a second supply mode such as for example a standby mode should coincide with a non-conducting mode of the relay. This embodiment and the following embodiments are, usually but not exclusively, related to non-bistable relays.

An embodiment is defined by the supply circuit receiving at least a part of the first amount of input power via first and second main contacts of the relay. First and second main contacts of the relay form usually part of a switch part of the relay, which switch part is usually controlled via a control part of the relay. When supplying at least a part of the first amount of input power via the first and second main contacts of the relay, in a conducting mode of the relay this part of the first amount of input power can be supplied, and in a non-conducting mode of the relay this part of the first amount of input power cannot be supplied. As a result, the supply circuit will show a good energy efficiency.

An embodiment is defined by the supply circuit comprising a first input coupled to the first main contact, a second input coupled to the second main contact, a third input, and first and second outputs to be coupled to the output circuit, the first output being coupled to the first input via a first branch, the first output being coupled to the second input via a second branch, and the first and second outputs being coupled to each other via an output capacitor. This is a simple embodiment. The second amount of input power will arrive via the first branch, and the first amount of input power will arrive via a parallel circuit of the first and second branches. The output capacitor provides intermediate energy for bridging both supply modes.

An embodiment is defined by the first branch comprising a first resistor and a first capacitor coupled serially, the second branch comprising a second resistor and a second capacitor coupled serially, the first capacitor having a smaller value than the second capacitor, the first branch being coupled to the first output via a first diode and to the second output via a second diode, the second branch being coupled to the first output via a third diode and to the second output via a fourth diode, the first output being coupled to the third input via a fifth diode, the second output being coupled to the third input via a sixth diode, and the supply circuit further comprising a voltage stabilizer coupled in parallel to the output capacitor. This is a low cost embodiment. The function of the first and second resistors is to limit a peak current during fast voltage transients. By giving the first capacitor a smaller value than the second capacitor, the first amount of input power will be much larger than the second amount of input power. In case of the source being a direct-current source or DC source, the first and second capacitors are to be left out, and all diodes may be left out, and the first resistor may then be given a larger value than the second resistor, or not.

An embodiment is defined by the supply circuit comprising a switch for switching an output signal level, the first supply mode corresponding with a first output signal level, and the second supply mode corresponding with a second output signal level that is lower than the first output signal level, at least a part of the first output signal level corresponding with a conducting mode of the relay, and the second output signal level corresponding with a non-conducting mode of the relay. In the first supply mode, the first and higher output signal level such as a first voltage may be used for bringing the relay in the conducting mode. In the second supply mode, the second and lower output signal level such as a second voltage is insufficiently high to bring the relay in the conducting mode and cannot be used for bringing the relay in the conducting mode, and as a result, the relay will stay in the non-conducting mode.

An embodiment is defined by the relay comprising first and second main contacts, the supply circuit comprising a first input coupled to the first main contact, a second input, and first and second outputs to be coupled to the output circuit, the first output being coupled to the first input via a branch, the first and second outputs being coupled to each other via a first voltage stabilizer, one of the first and second outputs being coupled to one of first and second main contacts of the switch via a second voltage stabilizer, and the other one of the first and second outputs being coupled to the other one of the first and second main contacts of the switch. This is a simple embodiment. The first voltage stabilizer defines the first and higher output signal level such as the first voltage. The second voltage stabilizer defines the second and lower output signal level such as the second voltage. The switch may be a transistor or another relay etc.

An embodiment is defined by the branch comprising a resistor and a capacitor coupled serially, the branch being coupled to the first output via a first diode and to the second output via a second diode, the first output being coupled to the second input via a third diode, the second output being coupled to the second input via a fourth diode, and the supply circuit further comprising an output capacitor coupled in parallel to the first voltage stabilizer. This is a low cost embodiment. The output capacitor provides intermediate energy. In case of the source being a direct-current source or DC source, the capacitor coupled to the resistor is to be left out, and all diodes may be left out.

An embodiment is defined by the relay being a bistable relay, the first supply mode corresponding with a setting mode of the relay for setting or resetting the relay, and the second supply mode corresponding with a non-setting mode of the relay. This embodiment and the following embodiments are exclusively related to bistable relays that only require energy to go from a conducting mode into a non-conducting mode or vice versa and that do not require energy to stay in the conducting mode.

An embodiment is defined by the supply circuit comprising first and second inputs and first and second outputs, the first and second outputs being coupled to input terminals of a pulse generator for generating a setting pulse or a resetting pulse in the setting mode, output terminals of the pulse generator being coupled to the control part of the bistable relay, the first input being coupled to the first output via a first branch, the second input being coupled to the second output via a second branch, and the first and second outputs being coupled to each other via an output capacitor. This is a simple embodiment. The output capacitor stores and provides the energy required for the setting mode.

An embodiment is defined by the first branch comprising a first capacitor that is coupled to the first output via a first diode and to the second output via a second diode, and the second branch comprising a second capacitor that is coupled to the first output via a third diode and to the second output via a fourth diode. This is a low cost embodiment. Generally, the first amount of input power will be substantially equal to the second amount of input power. In case of the source being a direct-current source or DC source, the first and second capacitors are to be left out or to be replaced by first and second resistors, and all diodes may be left out. Asymmetric branches such as a first branch comprising a resistor and a capacitor coupled serially and a second branch comprising a wire only are not to be excluded.

An embodiment is defined by the supply circuit comprising a control circuit for controlling the supply circuit or a pulse generator coupled to the supply circuit in dependence of an available amount of energy present in an output capacitor. Owing to the fact that an amount of energy stored in the output capacitor at a certain moment in time may be insufficient to let for example the pulse generator generate a setting pulse or a resetting pulse in the setting mode, a control circuit might be introduced for guarding the amount of energy stored in the output capacitor and/or for overruling and/or delaying for example the pulse generator in case an insufficient amount of energy is available. Similarly, owing to the fact that an amount of energy stored in the output capacitor at a certain moment in time may be insufficient to let for example the supply circuit supply the switch circuit, a control circuit might be introduced for guarding the amount of energy stored in the output capacitor and/or for overruling and/or delaying for example the supply circuit in case an insufficient amount of energy is available.

A second aspect of the invention relates to a device comprising the supply circuit and further comprising at least one of the switch circuit and the output circuit and the load.

A third aspect of the invention relates to a method for supplying a switch circuit, the method comprising steps of, in a first supply mode, receiving a first amount of input power from a source and providing a first amount of output power to an output circuit comprising at least a control part of the switch circuit, and in a second supply mode, receiving a second amount of input power and providing a second amount of output power, the first amount of output power being larger than the second amount of output power, and the second amount of input power being larger than zero and being smaller than an amount of switch power necessary for operating the switch circuit.

Embodiments of the device and of the method correspond with the embodiments of the supply circuit.

An insight might be that a supply circuit for supplying a switch circuit may have a reduced power consumption as long as the switch circuit does not need to be operated.

A basic idea might be that the supply circuit should have at least two supply modes for providing different amounts of output power to an output circuit comprising at least a control part of the switch circuit.

A problem to provide a supply circuit for supplying a switch circuit, wherein the supply circuit has an improved energy efficiency, has been solved.

A further advantage is that in both supply modes, there always is output power available for the output circuit.

These and other aspects of the invention are apparent from and will be elucidated with reference to the embodiment(s) described hereinafter.

DETAILED DESCRIPTION OF EMBODIMENTS

Figure 1:
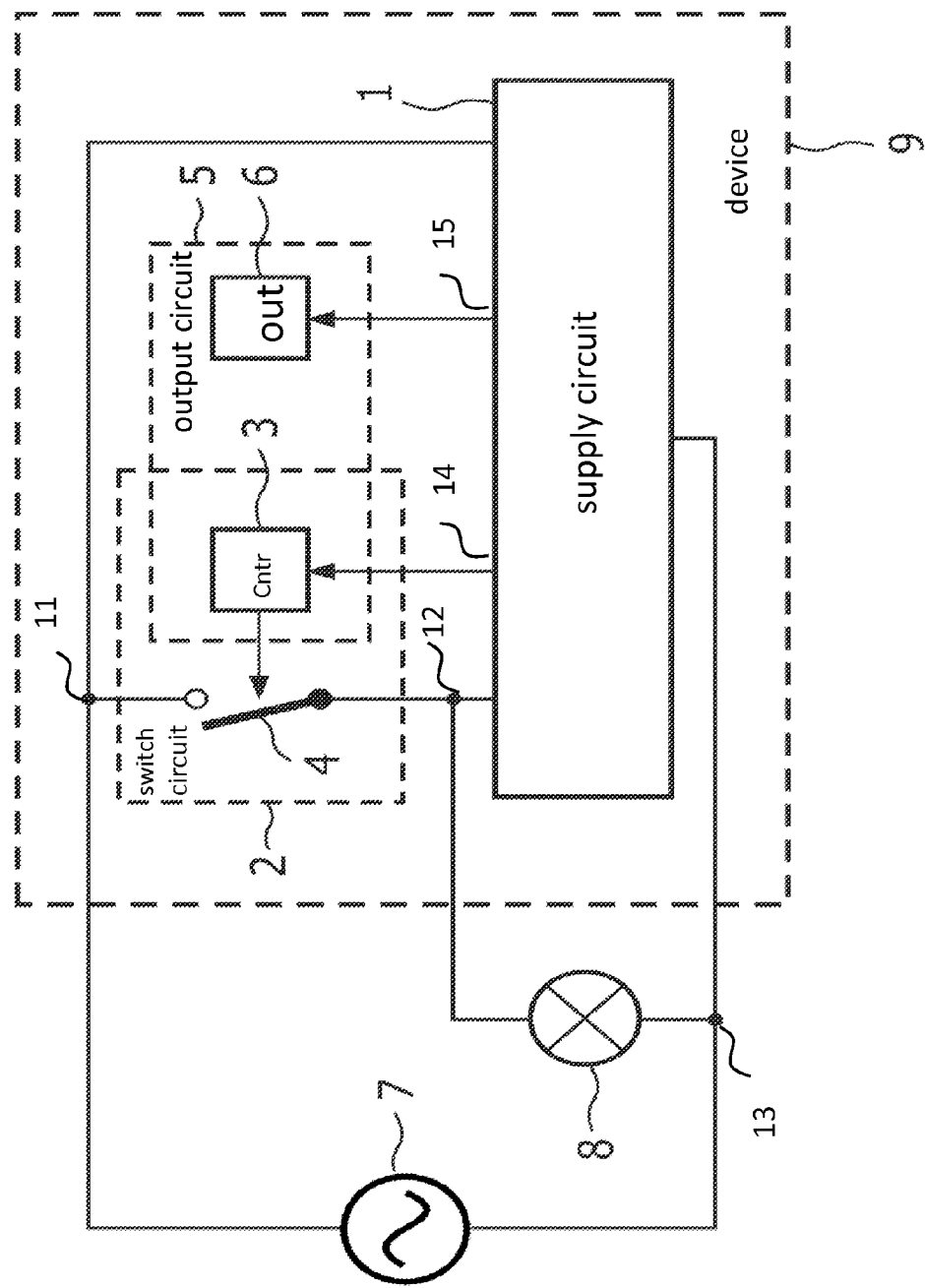
FIG. 1 shows a device comprising a supply circuit and a switch circuit.

In the FIG. 1, a device 9 is shown comprising a supply circuit 1 and a switch circuit 2 and an output circuit 5. The supply circuit 1 supplies the switch circuit 2. The supply circuit 1 has a first supply mode for receiving a first amount of input power from a source 7 such as an alternating-current source or AC source and providing a first amount of output power to the output circuit 5 comprising at least a control part 3 of the switch circuit 2. The switch circuit 2 further comprises a switch part 4 with first and second main contacts. The supply circuit 1 has a second supply mode for receiving a second amount of input power and providing a second amount of output power. The first amount of output power is larger than the second amount of output power. The second amount of input power is larger than zero and is smaller than an amount of switch power necessary for operating the switch circuit 2.

A first output terminal of the source 7 is coupled to a first main contact of the switch part 4 of the switch circuit 2 and to the supply circuit 1. A second output terminal of the source 7 is coupled to a first side of a load 8 and to the supply circuit 1. A second main contact of the switch part 4 of the switch circuit 2 is coupled to a second side of the load 8 and to the supply circuit 1. A first control output of the supply circuit 1 is coupled to a control contact of the control part 3 of the switch circuit 2. A second control output of the supply circuit 1 is coupled to a control contact of an other part 6 of the output circuit 5, such as a detector for detecting for example a presence or an absence of a person, or such as a receiver for receiving an instruction or information, for example for controlling the control part 3 in response to a detection or a reception.

The load 8 may be a lamp or any other kind of load, such as an appliance or a consumer product or an industrial product or a building automation product etc. The control part 3 and/or the switch part 4 of the switch circuit 2 may or may not form part of the supply circuit 1. The device 9 comprises the supply circuit 1 and further comprises at least a part of at least the switch circuit 2 and/or the output circuit 5 and/or the load 8. Preferably, the switch circuit 2 comprises a relay for switching the load 8.

According to a first embodiment, the first supply mode may correspond with a conducting mode of the relay, and the second supply mode may correspond with a non-conducting mode of the relay. The supply circuit 1 may receive at least a part of the first amount of input power via the first and second main contacts of the relay.

Figure 2:
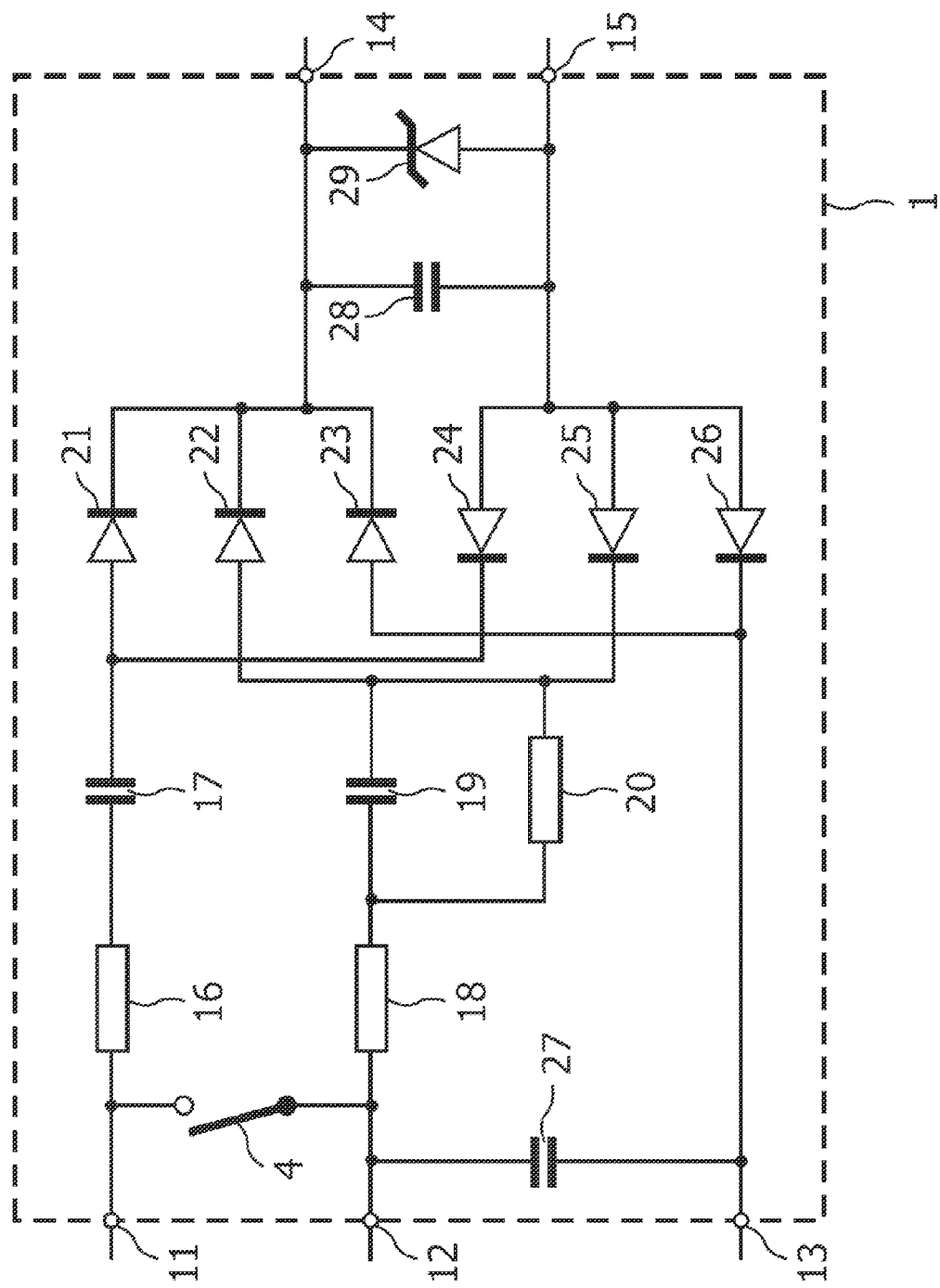
FIG. 2 shows a first embodiment of the supply circuit.

In the FIG. 2, this first embodiment of the supply circuit 1 is shown. The supply circuit 1 comprises a first input 11 coupled to the first main contact of the switch part 4 and to the first output terminal of the source 7 not shown here. The supply circuit 1 comprises a second input 12 coupled to the second main contact of the switch part 4 and to the load 8 not shown here. The supply circuit 1 comprises a third input 13 coupled to the second output terminal of the source 7 not shown here. The supply circuit 1 comprises first and second outputs 14 and 15 to be coupled to the output circuit 5 not shown here. The first output 14 is coupled to the first input 11 via a first branch, and the first output 14 is coupled to the second input 12 via a second branch. The first and second outputs 14 and 15 are coupled to each other via an output capacitor 28 for providing intermediate energy for bridging both supply modes.

Preferably, the first branch comprises a first resistor 16 and a first capacitor 17 coupled serially, and the second branch comprises a second resistor 18 and a second capacitor 19 coupled serially. The first resistor 16 may have a larger value than the second resistor 18, and the first capacitor 17 may have a smaller value than the second capacitor 19, in which case the first amount of input power will be larger than the second amount of input power. The first branch is coupled to the first output 14 via a first diode 21 and to the second output 15 via a second diode 24. The second branch is coupled to the first output 14 via a third diode 22 and to the second output 15 via a fourth diode 25. The first output 14 is coupled to the third input 13 via a fifth diode 23, and the second output 15 is coupled to the third input 13 via a sixth diode 26. The supply circuit 1 further comprises a voltage stabilizer 29 coupled in parallel to the output capacitor 28, and may further comprise another (relatively large) resistor 20 coupled in parallel to the second capacitor 19, and may further comprise another capacitor 27 coupled between the second and third inputs 12 and 13.

In case of the source 7 being a direct-current source or DC source, the first and second capacitors 17 and 19 are to be left out, and all diodes 21-26 may be left out.

According to a second embodiment, a switch may be used to switch output signal levels.

Figure 3:
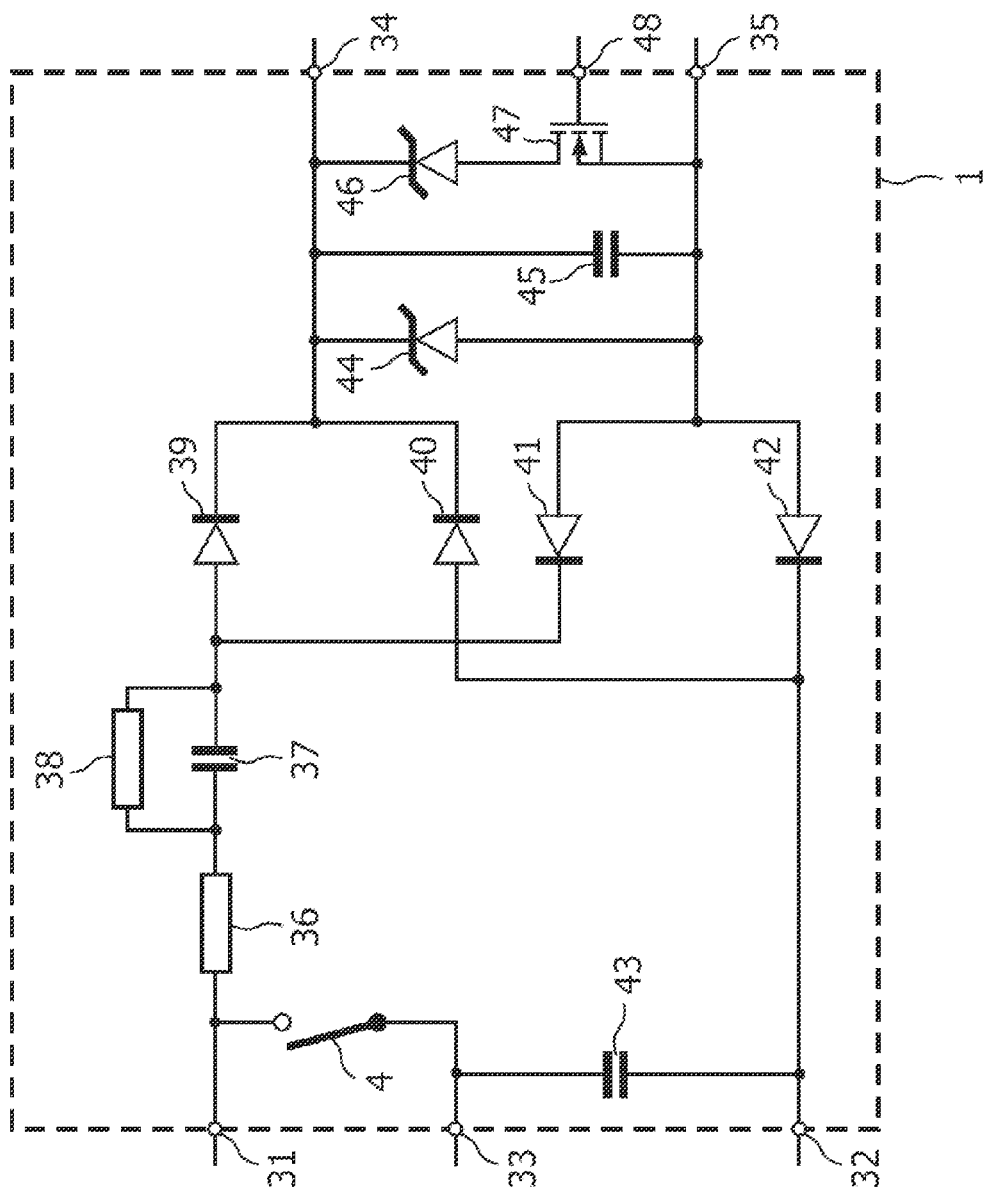
FIG. 3 shows a second embodiment of the supply circuit.

In the FIG. 3, this second embodiment of the supply circuit 1 is shown. The supply circuit 1 comprises a switch 47 for switching an output signal level. The first supply mode corresponds with a first output signal level, and the second supply mode corresponds with a second output signal level that is lower than the first output signal level. At least a part of the first output signal level corresponds with a conducting mode of the relay, and the second output signal level corresponds with a non-conducting mode of the relay.

The relay comprises first and second main contacts. The supply circuit 1 comprises a first input 31 coupled to the first main contact of the switch part 4 and to the first output terminal of the source 7 not shown here. The supply circuit 1 comprises a second input 32 coupled to the second output terminal of the source 7 not shown here. The supply circuit 1 comprises first and second outputs 34 and 35 to be coupled to the output circuit 5 not shown here. The first output 34 is coupled to the first input 31 via a branch. The first and second outputs 34 and 35 are coupled to each other via a first voltage stabilizer 44. One of the first and second outputs 34 and 35 is coupled to one of first and second main contacts of the switch 47 via a second voltage stabilizer 46, and the other one of the first and second outputs 34 and 35 is coupled to the other one of the first and second main contacts of the switch 47.

The control part 3 of the switch circuit 2 shown in the FIG. 1 may for example be connected in parallel to the main contacts of the switch 47 or to the outputs 34 and 35, to combine the switching of supply modes and relay modes.

Preferably, the branch comprises a resistor 36 and a capacitor 37 coupled serially. The branch is coupled to the first output 34 via a first diode 39 and to the second output 35 via a second diode 41. The first output 34 is coupled to the second input 32 via a third diode 40. The second output 35 is coupled to the second input 32 via a fourth diode 42. The supply circuit 1 further comprises an output capacitor 45 coupled in parallel to the first voltage stabilizer 44. The supply circuit 1 further comprises a terminal 33 coupled to the second main contact of the switch part 4 and to the load 8 not shown here. The supply circuit 1 may further comprise another (relatively large) resistor 38 coupled in parallel to the capacitor 37, and may further comprise another capacitor 43 coupled between the second input 32 and the terminal 33.

In the first supply mode, the first and higher output signal level such as a first voltage may be used for bringing the relay in the conducting mode. In the second supply mode, the second and lower output signal level such as a second voltage is insufficiently high to bring the relay in the conducting mode and cannot be used for bringing the relay in the conducting mode, and as a result, the relay will stay in the non-conducting mode. The first voltage stabilizer 44 defines the first and higher output signal level such as the first voltage. The second voltage stabilizer 46 defines the second and lower output signal level such as the second voltage. The switch 47 may be a transistor or another relay etc. The output capacitor 45 has a filter function, and its value should be kept as small as possible as its charging time will limit the switching speed of the relay. In case of the source 7 being a direct-current source or DC source, the capacitor 37 coupled to the resistor 36 is to be left out, and all diodes 39-42 may be left out.

According to third and fourth embodiments, the switch circuit 2 may be a bistable relay. The first supply mode corresponds with a setting mode of the relay for setting or resetting the relay, and the second supply mode corresponds with a non-setting mode of the relay. Bistable relays only require energy to go from a conducting mode into a non-conducting mode or vice versa and do not require energy to stay in the conducting mode.

Figure 4:
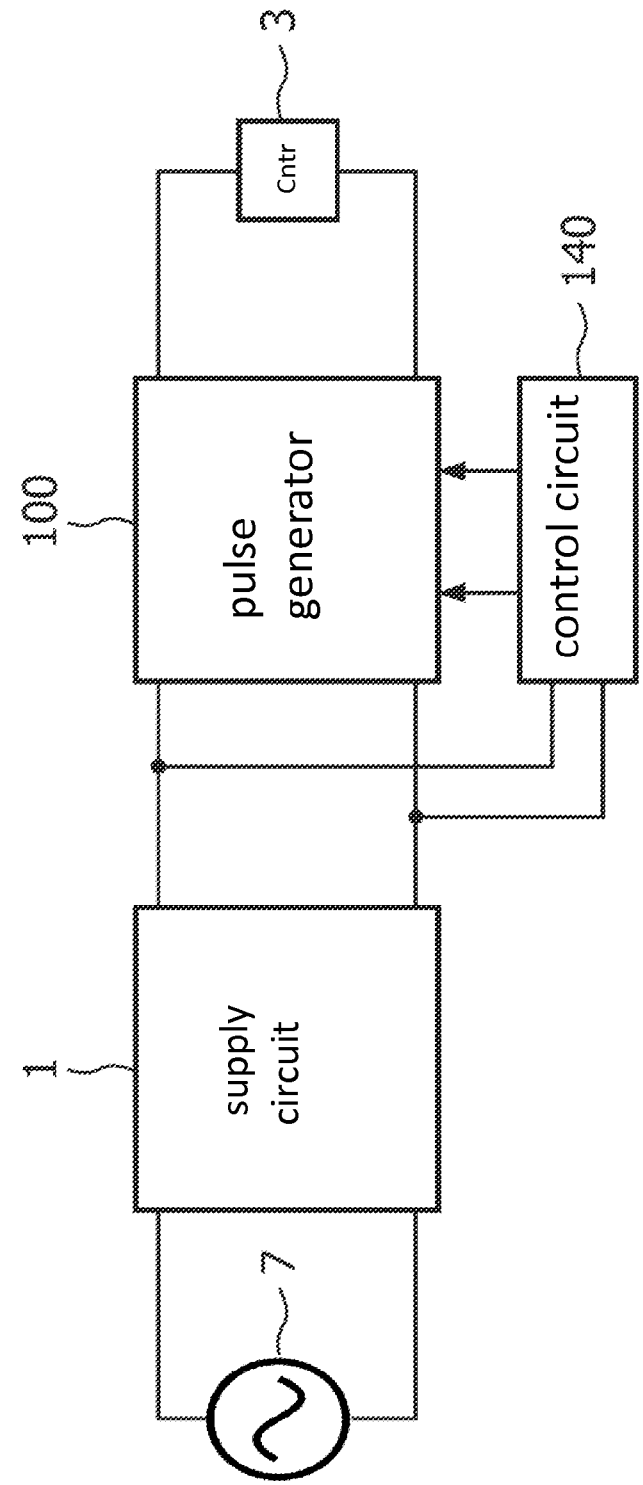
FIG. 4 shows a supply circuit coupled to a pulse generator.

In the FIG. 4, a supply circuit 1 coupled to a pulse generator 100 is shown. Inputs of the supply circuit 1 are coupled to output terminals of the source 7, outputs of the supply circuit 1 are coupled to inputs of the pulse generator 100 and to a control circuit 140 for controlling the pulse generator 100, and outputs of the pulse generator 100 are coupled to inputs of the control part 3 of the bistable relay.

Figure 5:
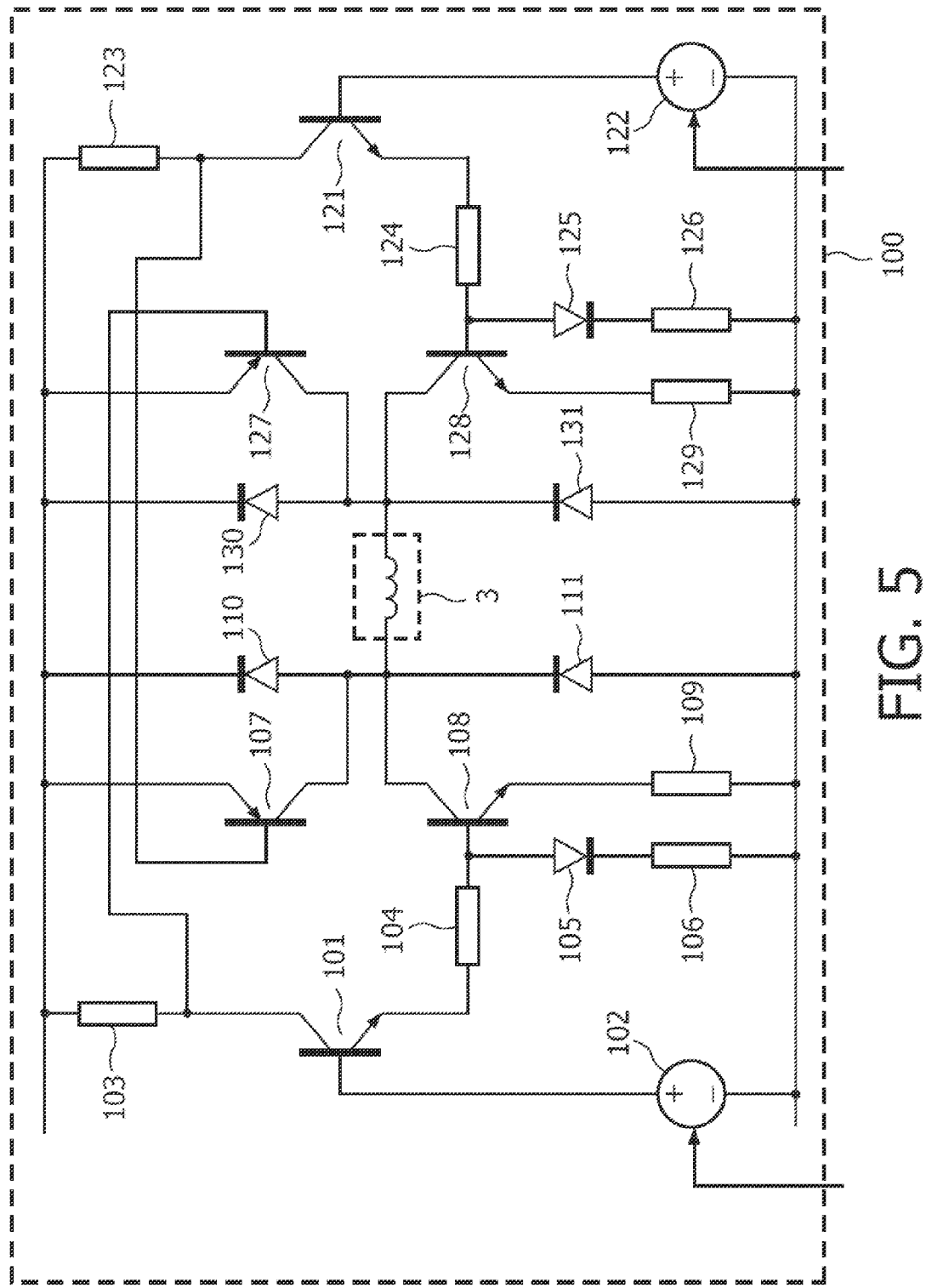
FIG. 5 shows a pulse generator in greater detail.

In the FIG. 5, a pulse generator 100 is shown in greater detail. A source 102 represents a setting input, and a source 122 represents a resetting input. The pulse generator 100 comprises transistors 101, 107, 108, 121, 127, 128, and comprises diodes 105, 110, 111, 125, 130, 131, and comprises resistors 103, 104, 106, 109, 123, 124, 126, 129, all as shown in the FIG. 5. The source 102 is coupled to a control electrode of the transistor 101, and the source 122 is coupled to a control electrode of the transistor 121 etc. Many alternatives for such a pulse generator 100 are possible and are not to be excluded. The control part 3 may comprise a single coil or a dual coil etc. The sources 102 and 122 are for example monostable timers for generating a pulse having a pulse width required to switch the bistable relay.

Figure 6:
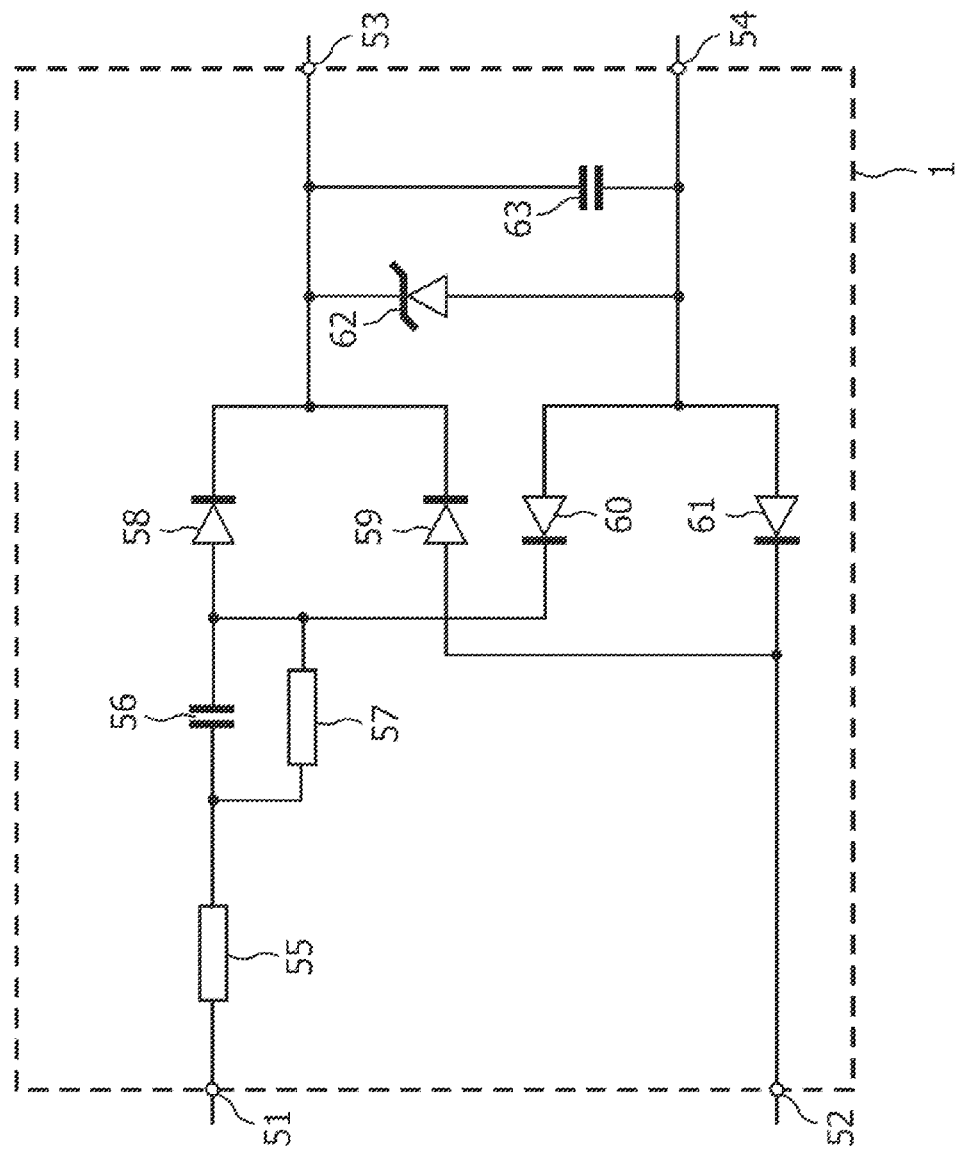
FIG. 6 shows a third embodiment of the supply circuit.

In the FIG. 6, the third embodiment of the supply circuit 1 is shown. The supply circuit 1 comprises first and second inputs 51 and 52 and first and second outputs 53 and 54. The first and second outputs 53 and 54 are coupled to input terminals of the pulse generator 100 shown in the FIG. 5. The pulse generator 100 supplies a setting pulse or a resetting pulse in the setting mode to the control part 3 of the bistable relay. The first input 51 is coupled to the first output 53 via a first branch, and the second input 52 is coupled to the second output 54 via a second branch. The first and second outputs 53 and 54 are coupled to each other via an output capacitor 63. In dependence of an available amount of energy present in the output capacitor 63, the control circuit 140 can control the pulse generator 100. Owing to the fact that an amount of energy stored in the output capacitor 63 at a certain moment in time may be insufficient to let the pulse generator 100 generate a setting pulse or a resetting pulse in the setting mode, the control circuit 140 may guard the amount of energy stored in the output capacitor 63 and/or may overrule and/or delay the pulse generator 100 in case an insufficient amount of energy is available.

Preferably, the first branch comprises a resistor 55 coupled to a capacitor 56 serially, and the second branch only comprises a wire. The resistor 55 protects against surges coming from the source 7. The first branch is coupled to the first output 53 via a first diode 58 and to the second output 54 via a second diode 60. The second branch is coupled to the first output 53 via a third diode 59 and to the second output 54 via a fourth diode 61. The supply circuit 1 further comprises a voltage stabilizer 62 coupled in parallel to the output capacitor 63. The supply circuit 1 may further comprise another (relatively large) resistor 57 (of for example 10 MOhm, preferably larger) coupled in parallel to the capacitor 56 for discharging purposes, if required. In case of the source 7 being a direct-current source or DC source, the capacitor 56 is to be left out and/or replaced by a further resistor, and all diodes 58-61 may be left out.

Figure 7:
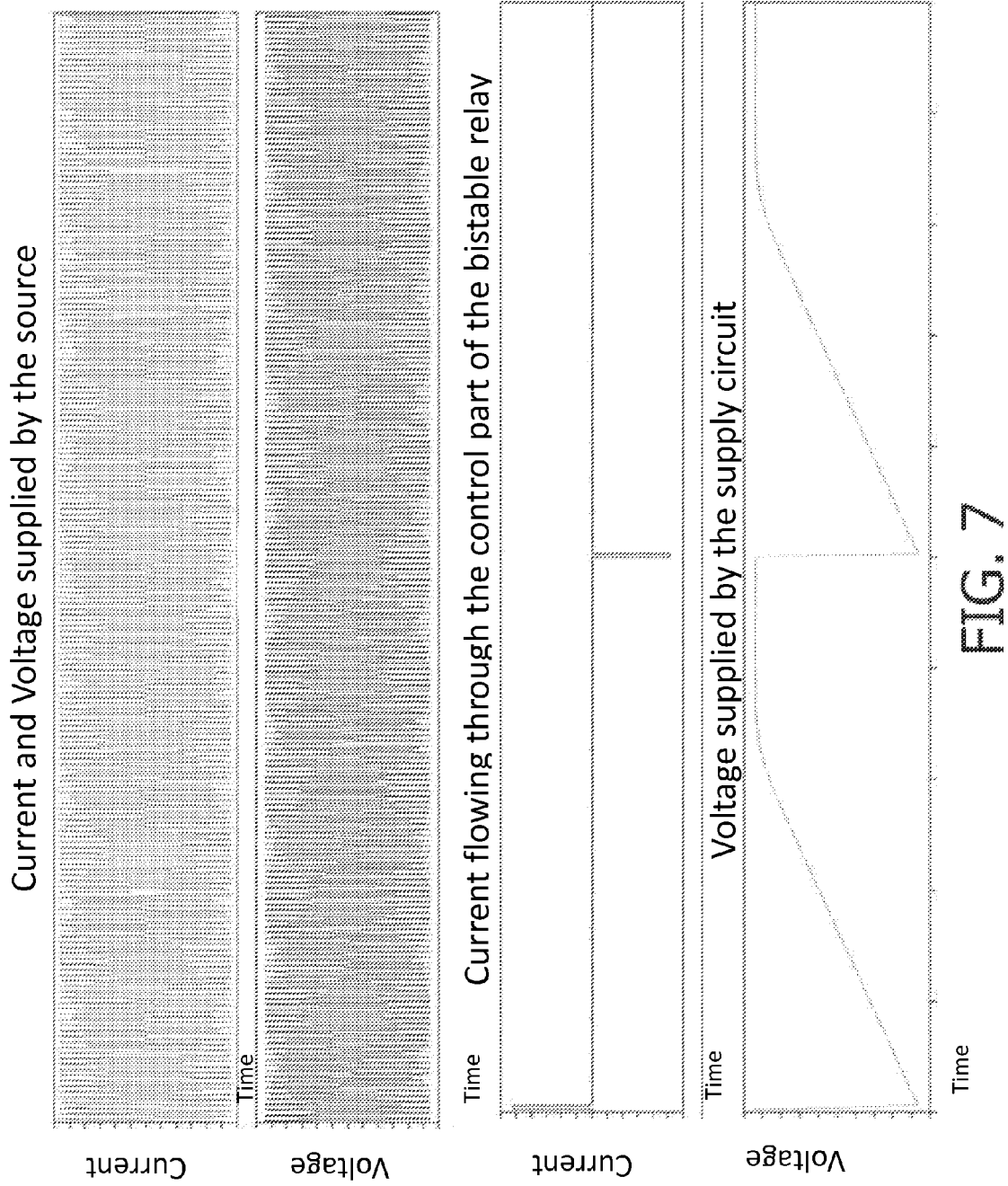
FIG. 7 shows current graphs and voltage graphs.

In the FIG. 7, current graphs and voltage graphs are shown. All above, a current supplied by the source 7 versus time is shown. Second from above, a voltage supplied by the source 7 versus time is shown. Second from below, a current flowing through the control part 3 of the bistable relay versus time is shown. All below, a voltage supplied by the supply circuit 1 versus time is shown. To create a setting pulse or a resetting pulse, sufficient energy should be available, as described above.

Figure 8:
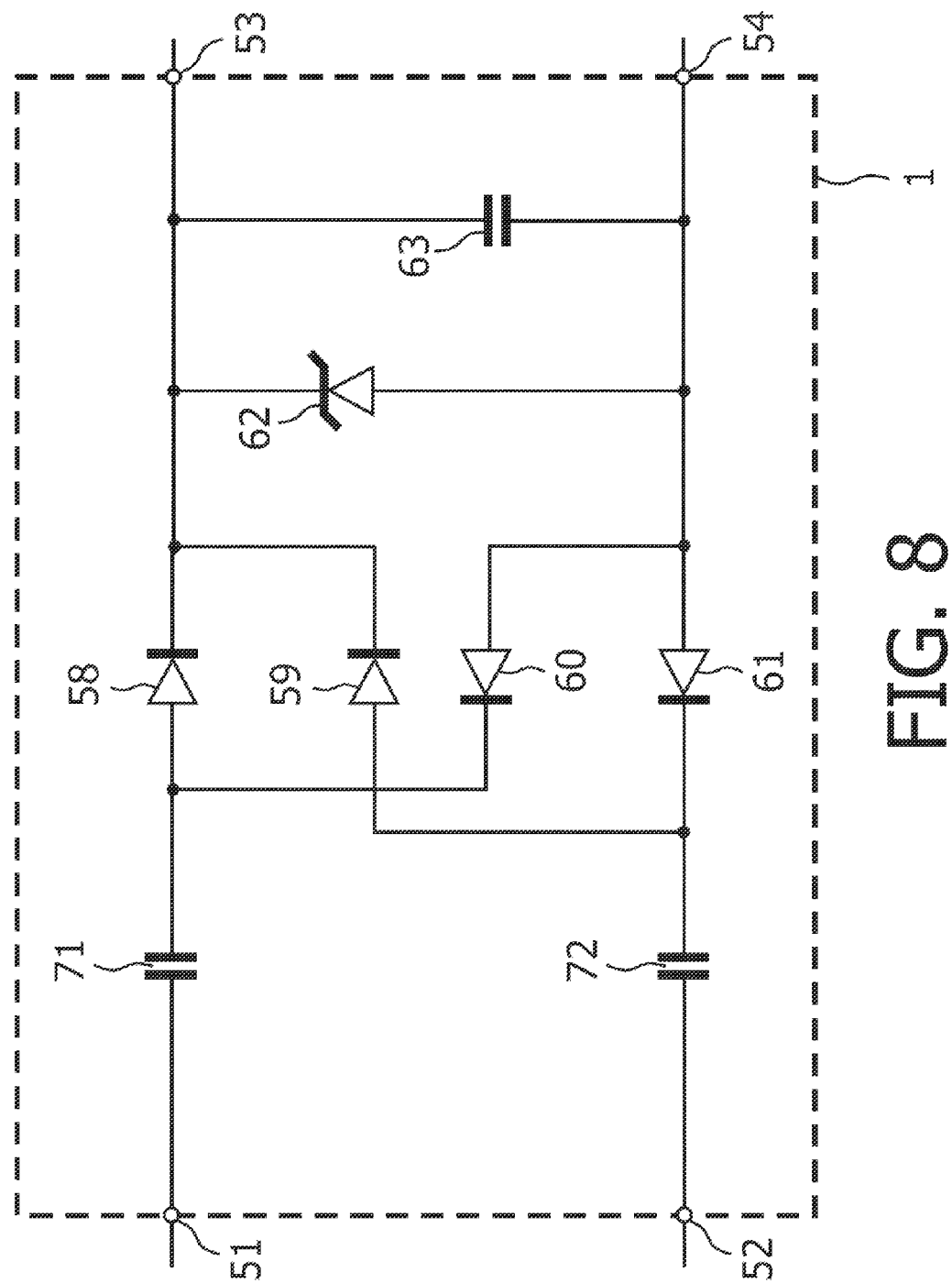
FIG. 8 shows a fourth embodiment of the supply circuit.

In the FIG. 8, the fourth embodiment of the supply circuit 1 is shown. This fourth embodiment only differs from the third embodiment shown in the FIG. 6 in that the first and second branches only comprise first and second capacitors 71 and 72. Optionally, resistors coupled serially to the capacitors 71 and 72 might be present. According to certain safety regulations, a sum of the capacitors 71 and 72 should not be larger than 4.7 nF.

Each embodiment of the invention allows a power consumption of a supply circuit to be reduced to 1% or 0.1% or even less % of a prior art value.

Two elements are coupled in case they are connected directly as well as in case they are connected indirectly via another element.

Interesting further embodiments may be related to bistable relays that are automatically switched to a conducting state when the mains is disconnected, to avoid a start-up time after a reconnection of the mains, and may be related to creating a two level supply circuit by using a first supply during a standby mode and by using a second supply of a load in an operation mode, whereby the first supply is only used to go from standby mode to operation mode and whereby in the operation mode the second supply is capable of providing more power than the first supply.

Summarizing, to improve energy efficiencies, supply circuits 1 for supplying switch circuits 2 have first supply modes for receiving first amounts of input power from sources 7 and providing first amounts of output power to output circuits 5 comprising control parts 3 of the switch circuits 2 and have second supply modes for receiving second amounts of input power and providing second amounts of output power. The first amounts of output power are larger than the second amounts of output power. The second amounts of input power are larger than zero and smaller than amounts of switch power necessary for operating the switch circuits 2. The switch circuits 2 may comprise relays for switching loads 8. The first amounts of input power may arrive via main contacts of the relays. Switches 47 may switch output signal levels. The relays may be bistable relays.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A supply circuit for supplying power to a switch circuit, the supply circuit having
    a first supply mode for receiving a first amount of input power from a source and providing a first amount of output power to an output circuit having at least a control part of the switch circuit, and
    a second supply mode for receiving a second amount of input power and providing a second amount of output power, the first amount of output power being larger than the second amount of output power, and the second amount of input power being larger than zero and being smaller than an amount of switch power necessary for operating the switch circuit
    the switch circuit including a relay for switching a load and electrically interposed between the first and second input, the relay actuating the supply circuit between the first supply mode and the second supply mode;
the supply circuit further having a first input coupled to the first main relay contact, a second input coupled to the second main relay contact, a third input, and first and second outputs coupled to the output circuit, the first output being coupled to the first input via a first branch, the first output being coupled to the second input via a second branch, and the first and second outputs being coupled to each other via an output capacitor, wherein
    the first branch comprises a first resistor and a first capacitor coupled serially, and
    the second branch comprises a second resistor and a second capacitor coupled serially, the first capacitor having a smaller value than the second capacitor,
    the first branch being coupled to the first output via a first diode and to the second output via a second diode,
    the second branch being coupled to the first output via a third diode and to the second output via a fourth diode, the first output being coupled to the third input via a fifth diode, the second output being coupled to the third input via a sixth diode, and the supply circuit further comprising a voltage stabilizer coupled in parallel to the output capacitor.

2. A supply circuit for supplying power, comprising:
    a first, second and third input and a first and second outputs;
    the first output being coupled to the first input via a first branch;
    the first output being coupled to the second input via a second branch;
    the first and second outputs being coupled to each other via an output capacitor and at least one voltage stabilizer in parallel with each other;
    the first branch comprising a first resistor and a first capacitor coupled serially;
    the supply circuit having
        a first supply mode for receiving a first amount of input power from a source and providing a first amount of output power;
        a second supply mode for receiving a second amount of input power and providing a second amount of output power, the first amount of output power being larger than the second amount of output power, and the second amount of input power being larger than zero and being smaller than an amount of a switch power necessary for operating a relay for switching a load;
    the relay electrically interposed between the first input and the second input;
    the first branch coupled to the first output by a first diode and to the second output by a second diode;
    the second branch coupled to the first output by a third diode and to the second output by a fourth diode;
    the first input coupled to a first relay contact, the second input coupled to a second relay contact.

3. The supply circuit of claim 2 further including a capacitor coupled between the third input and the second input.

4. The supply circuit of claim 2 wherein the second branch further includes a resister and a capacitor in serial.

5. The supply circuit of claim 2 further including a switch interposed between the first and second output.

6. A supply circuit for supplying power and including a relay for selecting an output power, comprising:
    a first and second inputs and a first and second outputs;
    the first and second inputs electrically connected to the first and second outputs and defining a first branch and a second branch;
    the first output being coupled to the first input via the first branch;
    the first output being coupled to the second input via the second branch;
    the relay electrically interposed between the first branch and the second branch;
    the first and second outputs being coupled to each other via an output capacitor and at least one voltage stabilizer in parallel with each other;
    the first branch including a first resistor and a first capacitor connected serially;
    the supply circuit having
        a first supply mode for receiving a first amount of input power from a source and providing a first amount of output power;
        a second supply mode for receiving a second amount of input power and providing a second amount of output power, the first amount of output power being larger than the second amount of output power, and the second amount of input power being larger than zero and being smaller than an amount of a relay power necessary for operating the relay for switching a load;
    the first branch coupled to the first output by a first diode and to the second output by a second diode;

the second branch coupled to the first output by a third diode and to the second output by a fourth diode;
the first input coupled to a first relay contact, the second input electrically coupled to a second relay contact.

* * * * *